United States Patent [19]

Reiff

[11] Patent Number: 4,523,887

[45] Date of Patent: Jun. 18, 1985

[54] STACKER CRANE FOR NARROW AISLES

[75] Inventor: Donald P. Reiff, Wauwatosa, Wis.

[73] Assignee: Harnischfeger Corporation, West Milwaukee, Wis.

[21] Appl. No.: 482,572

[22] Filed: Apr. 6, 1983

[51] Int. Cl.[3] .......................... B60P 1/04; B65G 1/00; B66C 17/10

[52] U.S. Cl. .................................... 414/664; 414/467; 414/539; 414/540; 414/631; 414/668; 414/277; 414/279; 212/124; 212/125; 212/128; 212/213

[58] Field of Search ............................... 414/266-268, 414/277, 279, 622, 283, 619, 637, 664-671, 631-633; 212/205, 211, 213, 124-125, 128-130, 140-141

[56] References Cited

U.S. PATENT DOCUMENTS

| | | | |
|---|---|---|---|
| 3,144,137 | 8/1964 | Valliere et al. | 212/128 |
| 3,351,219 | 11/1967 | Ruderfer | 414/277 |
| 3,643,825 | 2/1972 | Zane, Jr. | 414/633 |
| 3,750,804 | 8/1973 | Lemelson | 414/283 |
| 3,880,299 | 4/1975 | Zollinger et al. | 414/279 |
| 4,248,353 | 2/1981 | Budzich et al. | 212/128 |
| 4,286,911 | 9/1981 | Benjamin | 414/279 |
| 4,316,528 | 2/1982 | Deschantsreiter | 212/213 |
| 4,375,936 | 3/1983 | Deschantsreiter | 212/129 |

FOREIGN PATENT DOCUMENTS

| | | | |
|---|---|---|---|
| 535643 | 2/1955 | Belgium | 414/279 |
| 1062177 | 7/1959 | Fed. Rep. of Germany | 414/279 |
| 1068628 | 11/1959 | Fed. Rep. of Germany | 212/128 |
| 1229454 | 11/1966 | Fed. Rep. of Germany | 414/279 |
| 2027872 | 6/1970 | Fed. Rep. of Germany | 414/667 |
| 2726147 | 12/1978 | Fed. Rep. of Germany | 414/667 |
| 2803895 | 10/1979 | Fed. Rep. of Germany | 212/130 |
| 1048354 | 12/1953 | France | 212/125 |
| 174162 | 1/1961 | Sweden | 414/633 |
| 971444 | 9/1964 | United Kingdom | 414/633 |
| 1181476 | 2/1970 | United Kingdom | 414/279 |

*Primary Examiner*—Trygve M. Blix
*Assistant Examiner*—R. B. Johnson
*Attorney, Agent, or Firm*—James E. Nilles

[57] ABSTRACT

In a stacker crane having a trolley comprising a turntable rotatable about a vertical axis, a mast projecting down from the turntable for rotation and horizontal motion with it, and a load supporting device vertically positionable along the mast, the mast comprises two mast elements spaced to opposite sides of said axis, and said device comprises an inverted U-shaped carriage member having its legs engaged along the inner sides of the mast elements and a shuttle member comprising load supporting tongues projecting forward from a frame. Rollers on the shuttle member frame engage fore-and-aft extending tracks on the legs of the carriage member to confine the shuttle member to horizontal motion relative to the carriage member between an extended position wherein said frame is spaced forward from said axis and a retracted position wherein said axis extends through the shuttle member.

1 Claim, 9 Drawing Figures

STACKER CRANE FOR NARROW AISLES

FIELD OF THE INVENTION

This invention relates to stacker cranes, that is, to cranes of the type comprising an elevated trolley which is movable along a defined horizontal transport path and on which there is a turntable that is rotatable about a vertical axis and is movable transversely to the transport path, a mast that projects downwardly from the turntable to rotate about said axis and move horizontally with the turntable, and load supporting means vertically positionable along the mast. The invention is more particularly concerned with a stacker crane capable of operating in a narrow aisle, that is, in a situation where there is only a small distance between obstructions at opposite sides of a path of transporting movement of the mast.

BACKGROUND OF THE PRIOR ART

The trolley of a stacker crane runs on elevated transport rails, and the trolley itself comprises a pair of bridging rails on which a turntable is mounted, so that the turntable can be moved both parallel to the transport rails and transversely to them. The mast that projects downward from the turntable is thus movable horizontally in all directions as well as being rotatable about its own axis by rotation of the turntable.

In a typical installation, a stacker crane is used with racks that provide storage stations arranged in horizontal rows and vertical columns. Usually such racks are located on opposite sides of an aisle that extends parallel to the transport rails. The mast is moved along the racks to be brought opposite a vertical column that contains a storage station to be loaded or unloaded, and the load supporting means is moved vertically along the mast to a position at which that station is directly in front of it, whereupon the load supporting means must be moved forwardly into the station to accomplish loading or unloading.

In heretofore conventional stacker cranes, the load supporting means usually comprised a pair of forwardly projecting tongues, generally similar to the fork of a fork lift truck, mounted on one side of the mast to project outwardly from it. The load supporting means was moved into and out of a storage station by an appropriate horizontal movement of the mast.

Because the load supporting means of such a crane was disposed wholly at one side of the mast, the width of any aisle in which the crane had to perform loading and unloading operations had to be equal to the length of the load supporting means, plus the width of the mast, plus reasonable clearance. Since the loads to be handled by the crane were normally no wider than the length of the load supporting tongues, the width of an aisle between storage racks had to be substantially greater than would have been adequate for the dimensions of the loads themselves, the additional width being accounted for by the width of the mast, which could be on the order of three feet. Such additional aisle width, multiplied by the length of the aisle or aisles along which the stacker crane operated, amounted to a very significant number of square feet of floor area that had to be provided for no other purpose than to meet requirements of the stacker crane. In a building initially constructed to accommodate a stacker crane installation, the need for this additional floor area not only increased construction costs but also involved proportionate increases in maintenance costs, taxes and insurance. In a building already constructed, the advantages obtainable from installation of a stacker crane could be more than offset by sacrifice to the crane of floor space needed for other purposes.

Economic disadvantages were not the only ones imposed by the heretofore conventional stacker crane configuration. There were situations in which a stacker crane could not be used because of space limitations, even though use of such a crane would otherwise have been highly advantageous. Consider, for example, a shop having two rows of forming presses arranged at opposite sides of a relatively narrow aisle, each having an overhanging top portion that projects into the aisle, and each requiring an occasional change of heavy forming dies that can be stored in racks of the above described character. In this case—which is not an unusual one—the arrangement of the presses is mandated by rigid floor space limitations. Obviously it would be advantageous to employ a stacker crane for transporting the dies to and from the storage racks and moving them into and out of the bottom portions of the presses. But a stacker crane of prior configuration could not be used if the space between the bottom portions of opposite presses were just wide enough to accommodate the mast and the load engaging means, because the overhanging top portions of the presses would get in the way of the mast as it moved horizontally to carry the load supporting means to and from its loading and unloading position. Heretofore, in a shop such as just described, dies had to be moved into and out of each press manually, and several hours were needed for a die change that could have been accomplished in minutes if a stacker crane could have been used.

SUMMARY OF THE INVENTION

With these considerations in mind, the general object of the present invention is to provide a stacker crane capable of operating in substantially narrower aisles than prior stacker cranes but having all of the advantageous and desirable features of prior stacker cranes, including capability for loading and unloading selectably to both sides of an aisle.

Thus an ultimate objective of the invention is to provide a stacker crane which, in comparison to prior stacker cranes of equivalent capacity, requires less floor area for its own operations and thus makes possible a substantial reduction in costs of a new building in which it is to be installed as well as being suitable for installation in an existing building without requiring sacrifice of floor space needed for other operations.

A further and very important object of this invention is to provide a stacker crane capable of operating in any aisle space that is wide enough to accommodate its load supporting means, even though stationary structures at one or both sides of the aisle may have overhanging top portions that project out into the aisle.

A more specific object of the invention is to provide a stacker crane of the character described, having a load supporting fork movable horizontally relative to the mast between an extended position in which the fork is wholly spaced from the mast itself as well as from the axis about which the mast rotates, and a retracted position in which a portion of the fork is intersected by said axis.

It is also a specific object of the invention to provide a stacker crane which is so arranged that a load thereon is transported with its center of gravity near the turntable axis, and which thus provides for increased stability of load transport and decreased stresses and strains upon the mast and turntable structure as compared to heretofore conventional stacker cranes of equivalent capacity.

These and other objects of the invention that will appear as the description proceeds are achieved in a stacker crane that comprises an elevated horizontally movable trolley on which there is a turntable that is rotatable about a vertical axis, a mast projecting downward from said turntable to be horizontally movable and rotatable about said axis with the turntable, and load supporting means positionable vertically along the mast. The stacker crane of this invention is characterized by its mast comprising a pair of vertically extending mast elements that are spaced to opposite sides of said axis, and by its load supporting means comprising a carriage member of inverted U-shape that is disposed between the mast elements with each of its legs engaging one of the mast elements for guidance in its vertical motion. The load supporting means further comprises a shuttle member that is disposed between the legs of the carriage member, and cooperating means on the carriage member and the shuttle member for confining the latter to motion in opposite horizontal directions relative to the carriage member, between a retracted position of the shuttle member wherein said axis extends through it and an extended position wherein the shuttle member is wholly spaced from said axis. Said cooperating means comprises a pair of guide tracks on one of said members having opposite upwardly and downwardly facing surfaces that are elongated in said horizontal directions, said guide tracks being inwardly adjacent to respective legs of the carriage member; and two pairs of rollers on the other of said members, one pair for each of said guide tracks, each said roller being rotatable on a horizontal axis that extends transversely to said directions, one roller of each pair being rollingly engaged with the upwardly facing surface of its guide track, and the other roller of each pair being engaged with the downwardly facing surface of its guide track.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
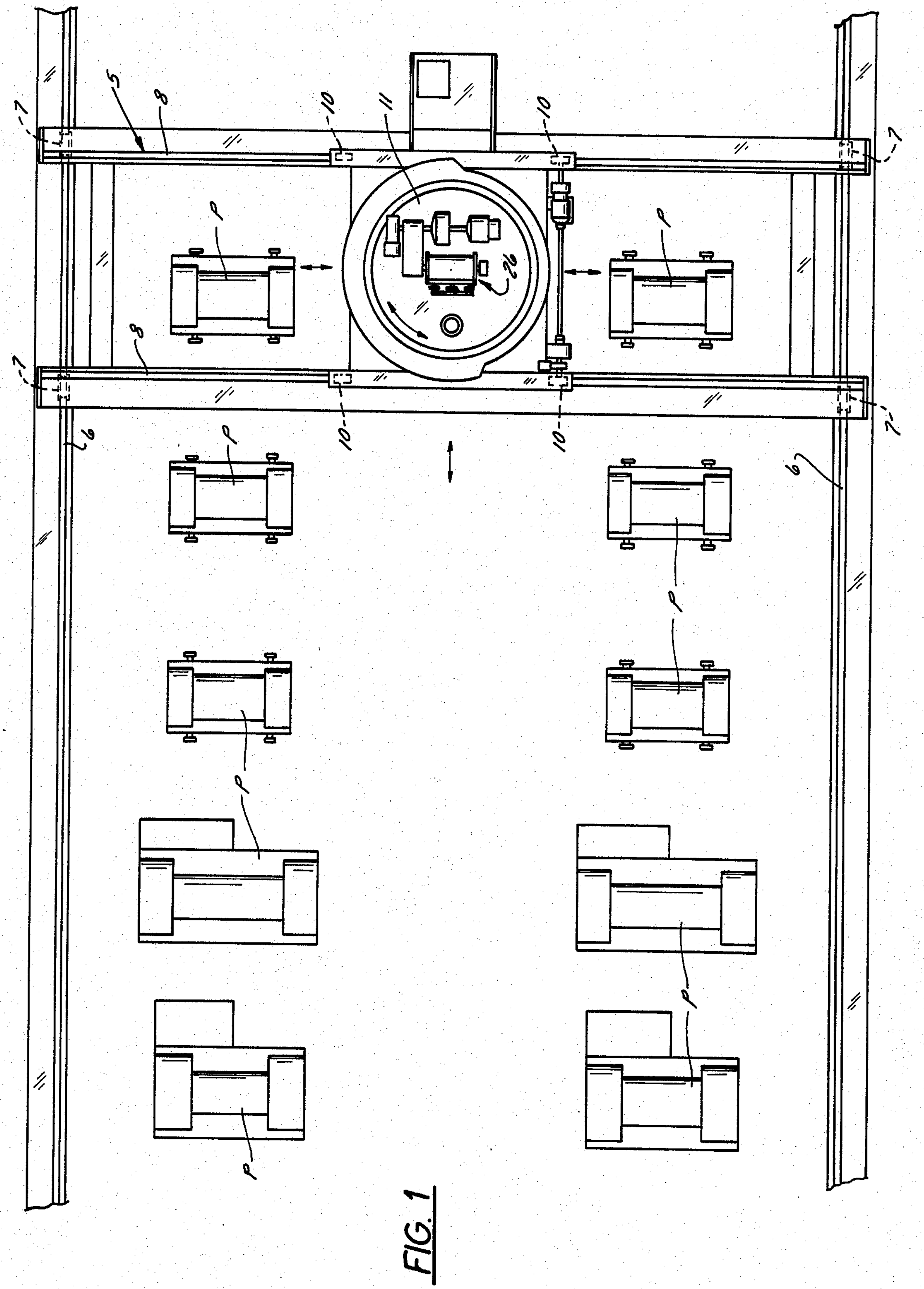
FIG. 1 is a plan view of an installation of a stacker crane of this invention in a shop in which a number of forming presses are operated.

In common with prior stacker cranes, the one of this invention comprises a trolley 5 that bridges across a pair of laterally spaced overhead transport rails 6. Flanged rollers 7 on the trolley 5 run on the rails 6 to guide the trolley in motion along the horizontal path that the rails define, and it will be understood that at least one of the rollers 7 is power driven for propulsion of the trolley along the rails.

The trolley 5, as is further generally conventional, comprises a pair of horizontal traverse rails 8, extending transversely to the transport rails 6, and a turntable 11 that has flanged rollers 10 which ride on the traverse rails 8. At least one of the rollers 10 is power driven. In being carried by the two sets of rails 6 and 8, the turntable 11 is movable in all horizontal directions, and it is rotatable about a vertical axis. Those having knowledge of the art relating to stacker cranes will be familiar with the means by which the turntable 11 is controllably power driven for its horizontal motion and rotation.

Secured to the turntable 11 in downwardly projecting relation to it is a mast 12, which is conventional insofar as its connection with the turntable constrains it to horizontal motion and to coaxial rotation therewith. The upper portion of the mast 12 is a short, sturdy, cylindrical tube 14 which is coaxial with the turntable and which supports at its lower end a transverse beam 15. A pair of mast elements 16 project downwardly from opposite ends of the beam 15 to be spaced equal distances to opposite sides of the axis about which the mast 12 rotates.

Each of the mast elements 16 comprises an inner mast member 17, which has its upper end rigidly attached to the beam 15 and which is therefore fixed as to its height, and an outer mast member 18 which is in telescoped surrounding relation to the inner mast member 17 and is movable up and down relative to it. The two mast members 17, 18 of each mast element 16 are preferably of square or rectangular cross-section and of hollow box-beam construction. It will be observed that each of the mast elements 16 resembles a prior single-column stacker crane mast in most respects.

The load supporting means 19 of the present crane is confined between the two mast elements 16 and comprises a carriage member 20 which is vertically positionable along the mast elements and a shuttle member 21 which is constrained to move up and down with the carriage member but is movable relative to it in horizontal extending and retracting directions.

The carriage member 20 is generally of inverted U-shape, having a pair of vertically extending legs 22 that are rigidly connected at their upper ends by a transverse bight portion 23. Each of the legs 22 of the carriage member is laterally inwardly adjacent to the outer member 18 of one of the mast elements 16 and has vertically spaced roller sets 24 that engage a rib-like rail 25 on its adjacent outer mast member 18 for guidance of the carriage member in up and down movement relative to the mast elements 16.

The carriage member 20 is lifted and lowered by means of a power-driven winch 26 mounted on top of the turntable 11. From the winch drum, hoisting cables 27 extend down through the turntable 11 and the cylindrical tube 14 to sheaves 28 mounted in a slot in the bight portion 23 of the carriage member, thence back up through the tube 14 to fixed anchor points on the turntable 11.

Figure 2:
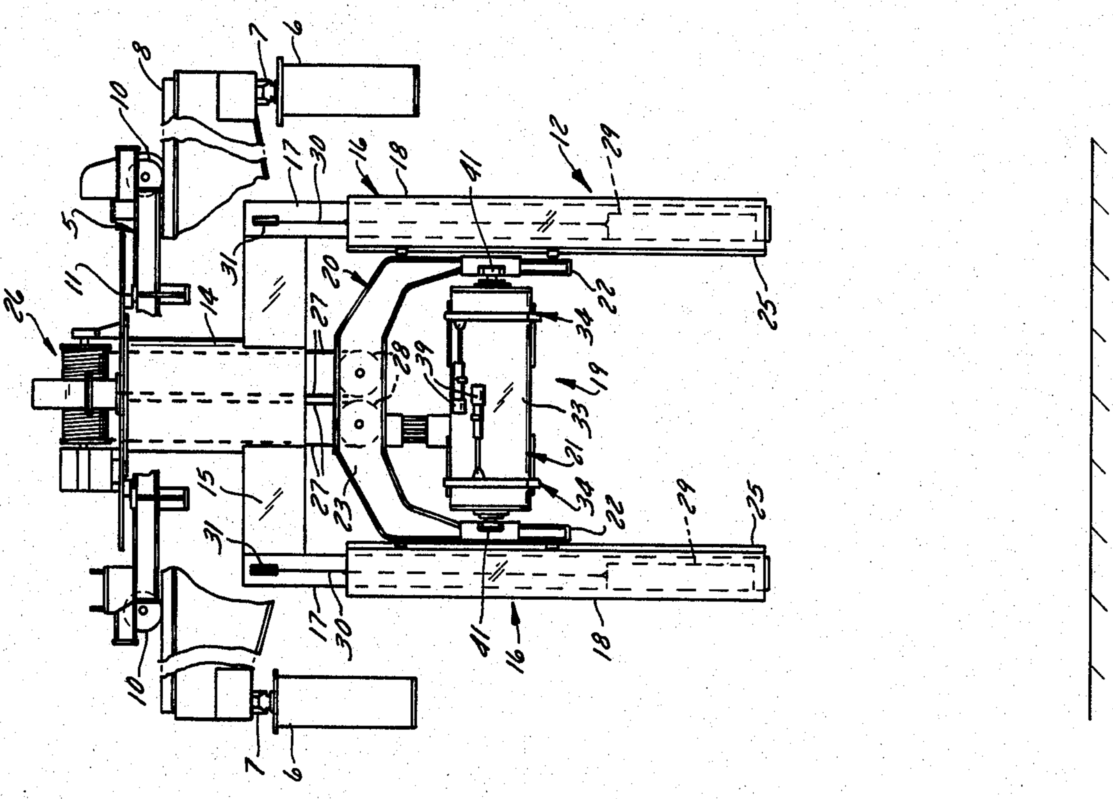
FIG. 2 is a view in side elevation of the stacker crane of this invention, shown with its load engaging means in a raised position.

When the carriage member 20 is in an upper portion of its range of vertical motion, each outer mast member 18 remains in a raised position, in which it is shown in FIG. 2 and in which it tends to be maintained by a counterweight 29 that is connected with it through a cable 30. Near the top of each inner mast member 17 there is mounted a freely rotatable sheave 31 around which the cable 30 for its outer mast member 18 is trained, and the cable thus extends up to the sheave 31 from a connection to the top of the outer mast member, thence down inside the hollow inner mast member 17 to the counterweight 29, which also moves up and down in the inner mast member. It will be apparent that when the carriage member is in an upper range of its motion, it moves relative to both mast members 17, 18 of each mast element; but when it is lowered to the bottom of the outer mast members 18, it will carry those mast members downward with it in any further descent. Thus, in the lower part of the range of motion of the carriage member 20, the outer mast members 18 move up and down in unison with it.

The shuttle member 21, which is disposed between the legs 22 of the carriage member, comprises a box-like frame 33 and a load engaging fork comprising a pair of L-shaped fork members 34, each having an upright leg 35 that overlies the front surface of the frame 33 and a forwardly projecting leg 36 that comprises a load supporting tongue. The upright leg 35 of each fork member 34 is slidably connected, by means of respective gibs 37, with rails 38 that extend along the top and bottom surfaces of the shuttle frame 33, near the front surface thereof. The two tongues 36 are thus laterally shiftable towards and from one another, and each is positioned in such adjusting motion by means of a linear electric motor 39 that is connected between its upright leg 35 and the front wall of the box-like frame 33.

To confine the shuttle member 21 to horizontal extending and retracting motion relative to the carriage member 20, the latter has a pair of opposite horizontally extending guide tracks 40, one on each of its legs 22, and the shuttle member has a pair of rollers 41 at each of its opposite sides, each pair of rollers being engaged with one of the guide tracks 40. As shown, each guide track 40 is a channel-shaped beam having a laterally inwardly opening groove 42 along its length that defines a hardened downwardly facing surface 43 and an opposite hardened upwardly facing surface 44. The axes of the several rollers 41 are all contained in a single horizontal plane. The two rollers 41 of each pair are spaced apart in the direction lengthwise of the tracks 40, and each roller at one side of the frame 33 is coaxial with a roller at the other side of the frame. The front roller 41 of each pair (i.e., the one nearer the fork members 34) engages the upwardly facing surface 44 of its track, while the rear one engages the downwardly facing surface 43. The rollers are maintained in such engagement with the track surfaces 43, 44 by the tilting moment exerted about the coinciding axes of the front rollers by the fork members 34 and any load they are carrying.

To prevent compressive deformation of the rollers 41 and their cooperating track surfaces 43 and 44 under the heavy loads imposed upon them, the rollers 41 have the largest possible diameter consistent with other parameters of the carriage member and the shuttle member, and the engaged surfaces of the rollers and the guide tracks 40 are hardened. There need be only a few thousandths of an inch clearance between each roller 41 and the guide track surface that is opposite the one the roller engages.

On each side of the shuttle member frame 33 are mounted idler rollers 45 that are freely rotatable about vertical axes, each of which engages an upright surface 46 on its adjacent guide track 40 to confine the shuttle member against side-to-side motion towards and from the respective guide tracks.

Inside the box-like frame 33 of the shuttle member is a reversible electric motor 47 that rotatably drives at least one of the rollers 41 of each pair through a gear box 48, to actuate the shuttle member 21 in its extending and retracting motion. It will be understood that the motor 47 is of a type that is braked when it is not actually rotating, to provide for accurate positioning of the shuttle member 21 relative to the carriage member 20 and to confine the shuttle member against undesired shifting along the guide tracks.

Current is brought to the roller drive motor 47 and the linear motors 39 through flexible conductor cables (not shown), which can be arranged in a manner that will be familiar to those skilled in the art relating to hoisting apparatus.

Each of the guide tracks 40 has a length substantially equal to that of the shuttle member 21 as measured from the front ends of its tongues 36 to the rear surface of its box-like frame 33. Furthermore, each guide track projects to both sides of its adjacent mast element 16, although, as shown, each guide track preferably projects a little farther beyond the mast elements in the forward or extending direction than in the opposite direction. To reinforce the projecting end portions of the guide tracks, so that they can readily support heavy loads imposed upon them when the shuttle member is in its limit positions, they are preferably connected with the legs 22 of the carriage member by gussets (not shown).

Figure 5:
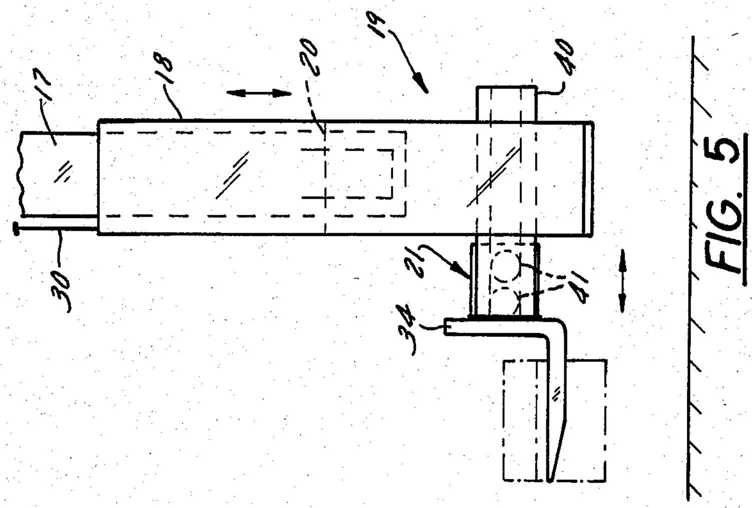
FIG. 5 is a view in side elevation of the load supporting means and the lower portion of the mast, with the shuttle member in its extended position.
Figure 4:
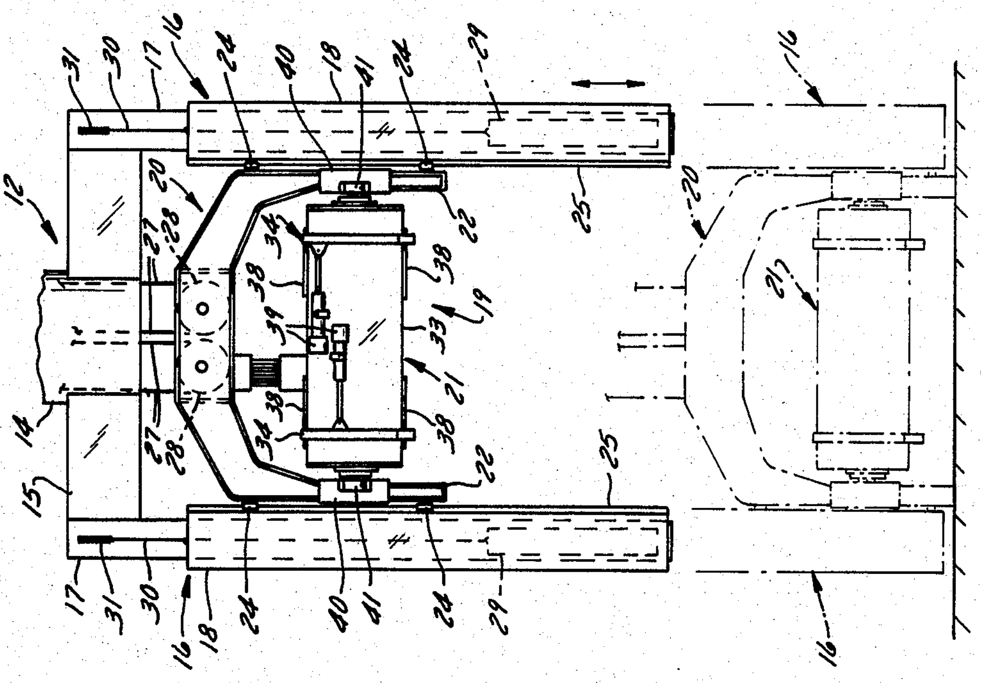
FIG. 4 is a view generally similar to FIG. 2, but on a larger scale than FIG. 2, and showing only portions of the crane that are below its trolley.
Figure 6:
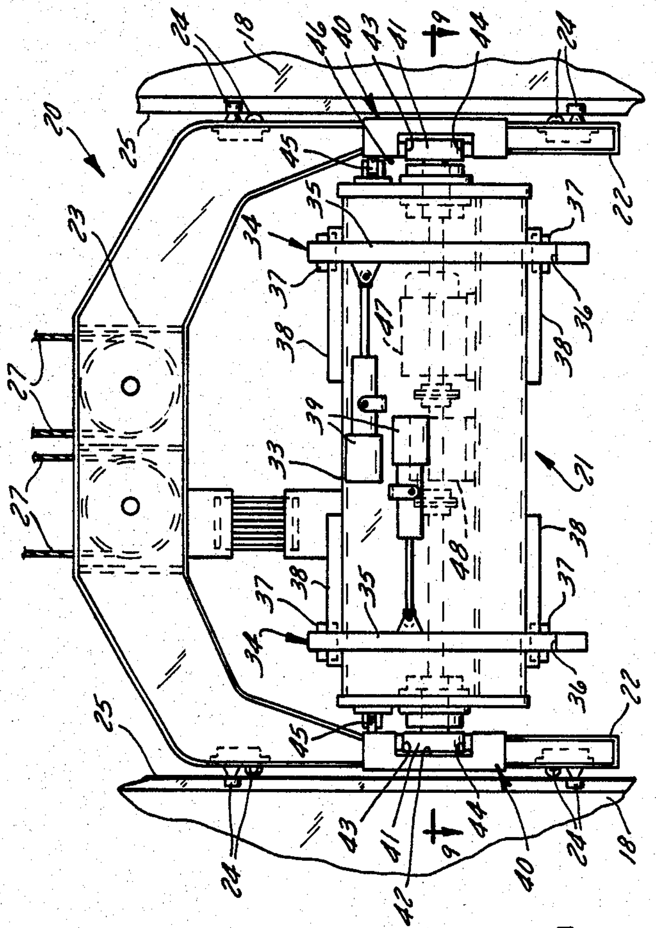
FIG. 6 is a front view of a larger scale of the load supporting means.
Figure 7:
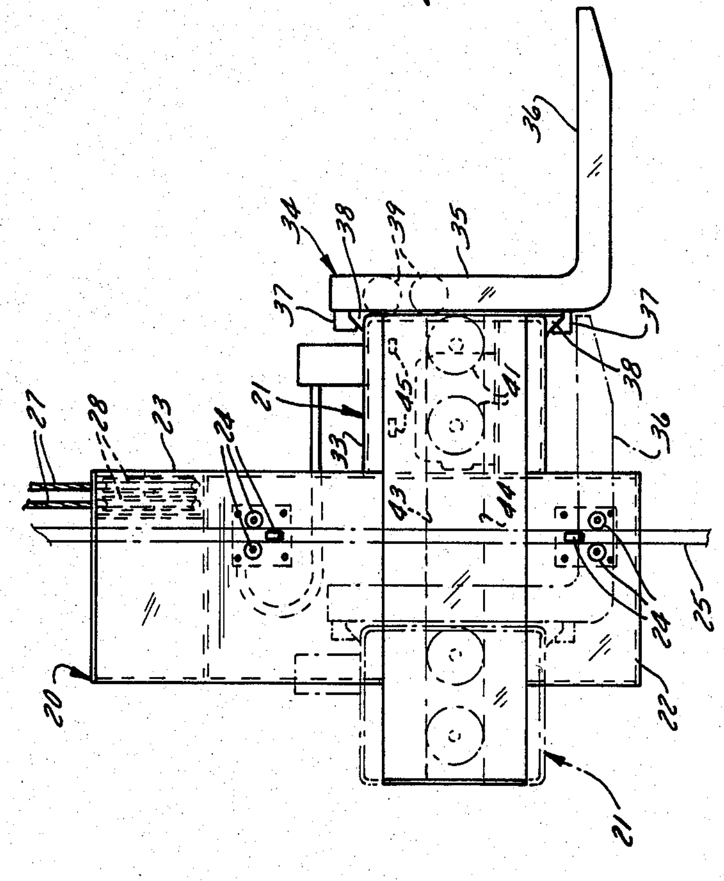
FIG. 7 is a view in side elevation of the load supporting means, illustrating its range of retracting and extending motion.
Figure 8:
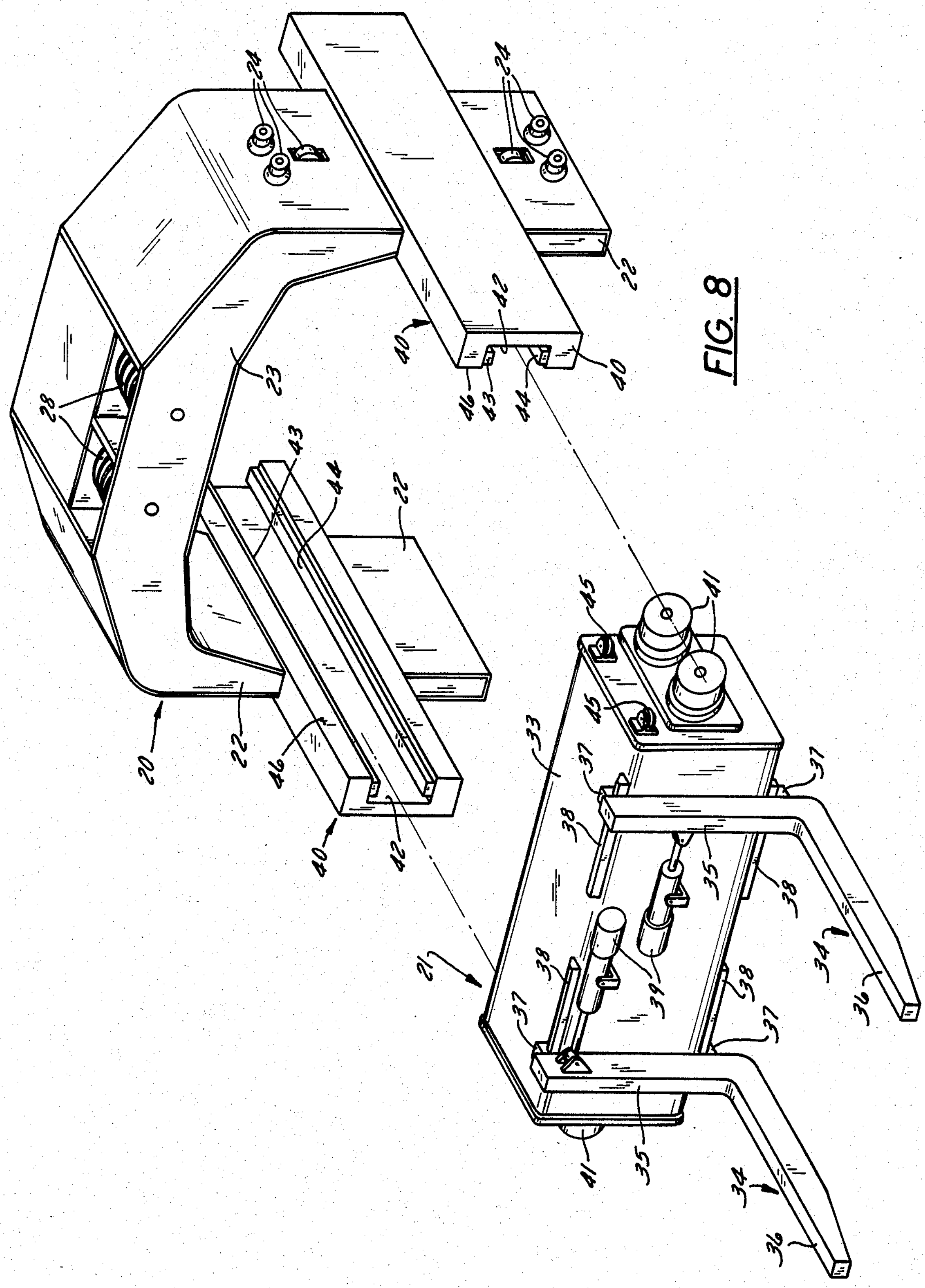
FIG. 8 is a disassembled perspective view of the two members that comprise the load supporting means.
Figure 9:
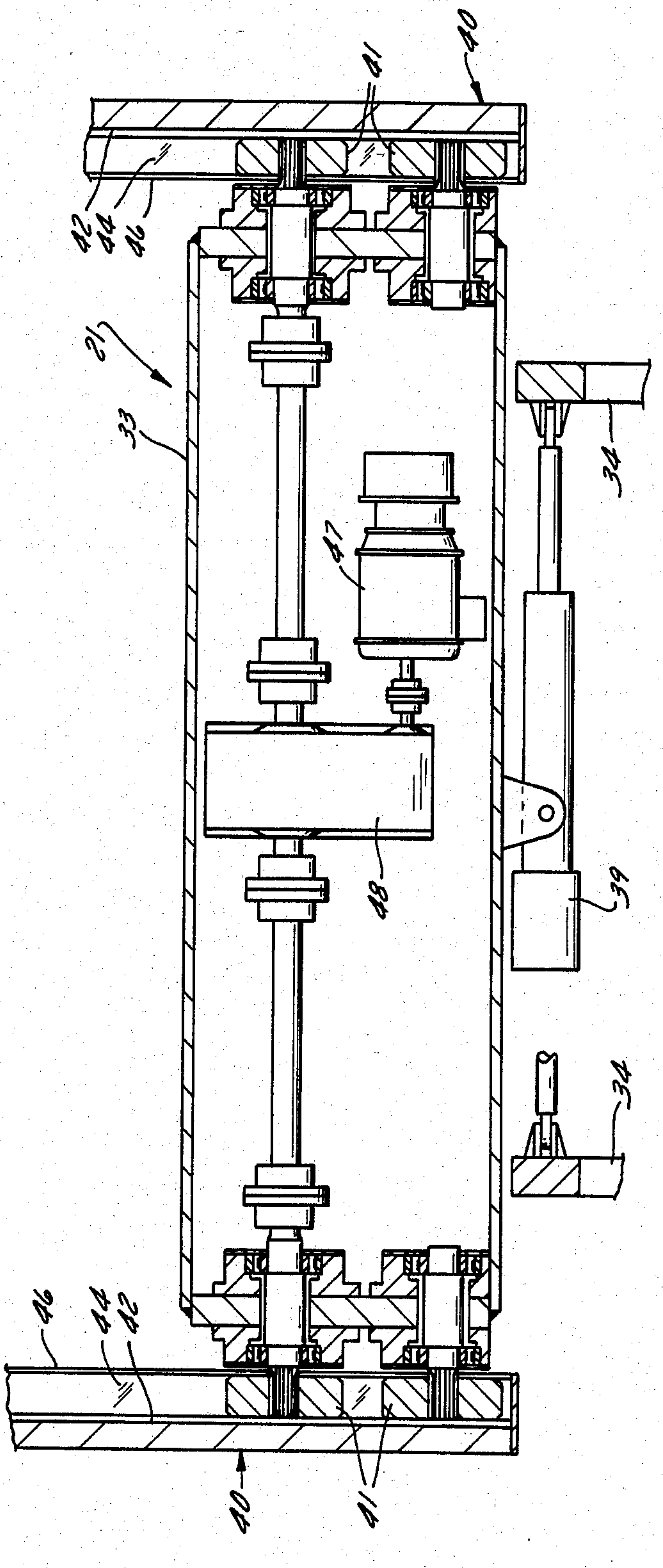
FIG. 9, is a view in horizontal section, taken on the plane of the line 9—9 in FIG. 6.

When the shuttle member 21 is in its retracted position (shown in broken lines in FIG. 7) it lies between the mast elements 16, substantially wholly within the confines of the carriage member 20; and the axis about which the mast 12 rotates then extends through a portion of the shuttle member. In its extended position, shown in FIG. 5, the shuttle member 21 is wholly spaced to one side of the rotational axis of the mast and in fact projects substantially farther forward from the mast than would a heretofore conventional load supporting fork having tongues of equivalent length.

Figure 3:
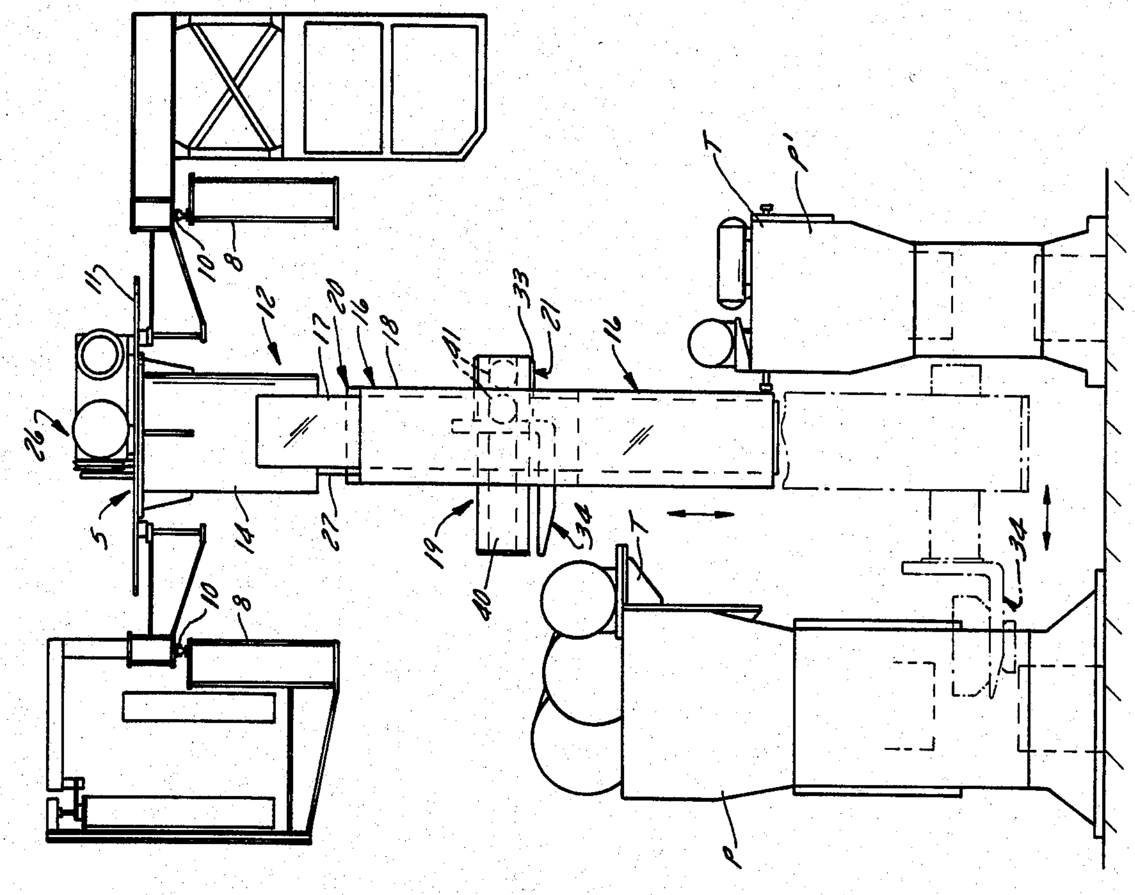
FIG. 3 is a view of the stacker crane in front elevation, showing it in relation to one of a pair of presses which are served by the crane and are spaced across a narrow aisle from one another.

An advantage of the stacker crane of this invention can be seen from FIG. 3, which illustrates a situation wherein a heretofore conventional stacker crane could not have been used. As there shown, left and right forming presses P, P' are spaced apart by a distance such that the mast and load supporting means of a stacker crane can be accommodated between their bottom portions, into which forming dies D must be loaded and unloaded from a position between the presses. However, each press P, P' has an overhanging top portion T which projects a substantial distance towards the other press and which severely limits left-and-right motion of the mast 12. With a prior stacker crane, wherein the load supporting fork could not move horizontally relative to the mast, loading and unloading a die into the left-hand press P would have required left-and-right travel of the mast through a distance at least equal to the length of the load engaging tongues, and that requirement could not have been met in the illustrated situation. However, with the shuttle member 21 in the crane of this invention in its retracted position, and with the carriage member 20 at the level of the bottom portions of the presses, the crane can be readily maneuvered into position between the two presses, with adequate clearance from both of them. Thereafter, movement of the shuttle member forwardly (leftward) to its extended position carries the die D nearly to the position where it must be unloaded, and only a small leftward movement of the mast is necessary to bring the die to its final position.

In addition to its capability for operating in confined spaces that would have been inaccessible to heretofore conventional stacker cranes, the stacker crane of this invention has the advantage that the center of gravity of the load is disposed close to the rotational axis of the turntable 11 when the shuttle member is in its retracted position. As a result, there is a more stable horizontal transport of the load, with less stresses and strains imposed upon the mast and turntable structures.

From the foregoing description taken with the accompanying drawings it will be apparent that this invention provides a stacker crane which is capable of operating very satisfactorily in much more confined spaces than prior stacker cranes of equivalent capacity and which can therefore be installed in existing shops, warehouses and the like without requiring substantial rearrangement of machines or storage facilities and without requiring sacrifice of operating capacities. It will also be apparent that the stacker crane of this invention, in requiring substantially less floor area for its satisfactory operation, makes possible a substantial saving in the cost of a new building in which it is to be installed, along with corresponding savings in maintenance costs, taxes and insurance on the building.

What is claimed as the invention is:

1. A stacker crane comprising a mast extending along a vertical axis, transport means supporting the mast for horizontal motion, and load supporting means positionable vertically along the mast, said transport means comprising an elevated trolley having a turntable thereon to which the mast is connected for rotation about said axis, and wherein a winch on said turntable, connected with the load supporting means by a cable, positions the load supporting means vertically along the mast, said stacker crane characterized by:

A. the mast having a short tubular upper portion concentric to said axis and connected to the turntable, through which said cable extends;

B. the mast comprising a pair of vertically extending mast elements that are spaced to opposite sides of said axis, (1) each of said mast elements having at its upper end a rigid connection to a transversely extending beam secured to said tubular upper portion;

C. the masts being connected with said transport means for rotation about said axis;

D. the load supporting means comprising a carriage member, said carriage member (1) being of inverted U-shaped with a pair of vertically extending legs connected at their upper ends by a sidewardly extending bight portion, (a) said cable having a connection to the bight portion of the carriage member, (2) being disposed between the mast elements with each of its legs guidingly engaging one of them, and (3) having a pair of horizontally extending parallel and opposite tracks, one on each leg, (a) each projecting in both a forward and a rearward direction beyond its leg, and (b) each defining a pair of opposite track surfaces that extend along at least a major portion of its length, (i) one of which faces upwardly and (ii) the other of which faces downwardly, (c) each of said tracks having a groove therein which opens towards the other track and which defines said surfaces;

E. the load supporting means further comprising (b 1) a frame confined between the tracks, (2) a pair of load engaging tongues projecting forwardly beyond said frame, (a) said tongues being mounted on said frame for translatory sideward motion, (3) two pairs of rollers on said frame, one pair for each of said tracks, (a) a front roller of each pair being rollingly engaged with said upwardly facing surface on its track, (b) the rear roller of each pair being rollingly engaged with said downwardly facing surface on its track, and (c) all of said rollers having their axes substantially contained in a single horizontal plane;

F. actuating means carried by the frame and connected with each of the tongues for adjustingly moving the tongues sidewardly towards and from one another; and G. means on said frame for reversibly rotatably driving one roller of each of said pairs, for moving the frame along said tracks to an extended forward position in which said tongues project beyond the front ends of said tracks and to a retracted rearward position in which said tongues are near said axis.

* * * * *